US011162866B2

(12) United States Patent
Gong et al.

(10) Patent No.: US 11,162,866 B2
(45) Date of Patent: Nov. 2, 2021

(54) SYSTEM AND METHOD FOR GENERATION OF A PRESSURE SIGNAL

(71) Applicant: The University of Adelaide, Adelaide (AU)

(72) Inventors: Jinzhe Gong, Adelaide (AU); Martin F. Lambert, Adelaide (AU); Angus R. Simpson, Adelaide (AU); Aaron C. Zecchin, Adelaide (AU)

(73) Assignee: THE UNIVERSITY OF ADELAIDE, Adelaide (AU)

( * ) Notice: Subject to any disclaimer, the term of this patent is extended or adjusted under 35 U.S.C. 154(b) by 277 days.

(21) Appl. No.: 15/743,231

(22) PCT Filed: Jul. 8, 2016

(86) PCT No.: PCT/AU2016/000246
§ 371 (c)(1),
(2) Date: Jan. 9, 2018

(87) PCT Pub. No.: WO2017/008100
PCT Pub. Date: Jan. 19, 2017

(65) Prior Publication Data
US 2018/0321110 A1    Nov. 8, 2018

(30) Foreign Application Priority Data
Jul. 10, 2015   (AU) ................................ 2015902731

(51) Int. Cl.
*G01M 3/28*    (2006.01)
*F17D 5/06*    (2006.01)
*G01M 3/24*    (2006.01)

(52) U.S. Cl.
CPC ............ *G01M 3/2815* (2013.01); *F17D 5/06* (2013.01); *G01M 3/243* (2013.01)

(58) Field of Classification Search
CPC .................................................. G01M 3/2815
(Continued)

(56) References Cited

U.S. PATENT DOCUMENTS 5,680,960 A * 10/1997 Keyes .................. G01F 11/284
137/563
6,212,942 B1   4/2001 Hara et al.
(Continued)

FOREIGN PATENT DOCUMENTS

CN       1311853 A    9/2001
CN     102162778 A    8/2011
(Continued)

OTHER PUBLICATIONS

Gong et al. "Determination of the linear frequency response of single pipelines using persistent transient excitation: a numerical investigation." Journal of Hydraulic Research 51.6 (2013): 728-734. (Year: 2013).*

(Continued)

*Primary Examiner* — Walter L Lindsay, Jr.
*Assistant Examiner* — Philipmarcus T Fadul
(74) *Attorney, Agent, or Firm* — Christensen O'Connor Johnson Kindness PLLC

(57) ABSTRACT

A system for generating a pressure signal in a pipeline system containing a pressurised fluid is disclosed The system includes a discharge valve in fluid communication with the pressurised fluid of the pipeline system to allow fluid from the pipeline system to discharge and an electronic controller to dynamically control a degree of opening of the discharge valve to selectively vary the discharge valve between a plurality of valve opening states to generate the pressure signal in the pipeline.

17 Claims, 12 Drawing Sheets

(58) Field of Classification Search
USPC .......................................................... 73/49.6
See application file for complete search history.

(56) References Cited

U.S. PATENT DOCUMENTS

| | | | |
|---|---|---|---|
| 6,272,438 | B1 | 8/2001 | Cunningham et al. |
| 6,289,723 | B1* | 9/2001 | Leon ....................... G01M 3/24 73/40.5 A |
| 7,856,864 | B2 | 12/2010 | McEwan et al. |
| 9,476,417 | B2* | 10/2016 | Kyllingstad ............. F04B 51/00 |
| 2006/0197041 | A1* | 9/2006 | Szymaszek ......... F16K 31/1245 251/30.02 |
| 2012/0041694 | A1* | 2/2012 | Stephens ................ G01B 17/02 702/50 |
| 2013/0333474 | A1 | 12/2013 | Godfrey et al. |
| 2015/0135803 | A1 | 5/2015 | Halliwill |
| 2018/0252167 | A1* | 9/2018 | Suzuki ...................... F02D 9/02 |

FOREIGN PATENT DOCUMENTS

| | | |
|---|---|---|
| CN | 103492849 A | 1/2014 |
| CN | 104502450 A | 4/2015 |
| CN | 104655367 A | 5/2015 |

OTHER PUBLICATIONS

International Search Report dated Oct. 31, 2016, issued in corresponding International Application No. PCT/AU2016/000246, filed Jul. 8, 2016, 6 pages.
International Preliminary Report on Patentability and Written Opinion of the International Searching Authority dated Jan. 16, 2018, issued in corresponding International Application No. PCT/AU2016/000246, filed Jul. 8, 2016, 7 pages.
Gong, J., et al., "Frequency response measurement of pipelines by using inverse-repeat binary sequences," Proc. Int. Conf. CCWI 2011: Computing and Control for the Water Industry: Urban Water in Management—Challanges and Opportunities, Exeter, UK, pp. 883-888, Sep. 2011.
Gong, J., et al., "Determination of the linear frequency response of single pipelines using persistent transient excitation: a numerical investigation," Journal of Hydraulic Research, 51(6):728-734, Sep. 2013.
Gong, J., et al., "Frequency response diagram for pipeline leak detection: comparing the odd and even harmonics," Journal of Water Resources Planning and Management 140(1):65-74, Jan. 2014.
Roinila, T., et al., "Fast frequency response measurement of switched-mode converters in the presence of nonlinear distortions," IEEE Transactions on Power Electronics, 25(8):2179-2187, Aug. 2010.
Gong, J, et. al., "Leak Detection and Condition Assessment for Water Distribution Pipelines Using Fluid Transient Waves," PhD Thesis, University of Adelaide, published 2016, 370 pages.
Extended European Search Report dated Jul. 1, 2019, issued in corresponding EP Application No. 16823541.4, filed Jul. 8, 2016, 11 pages.
First Office Action dated May 30, 2019, issued in corresponding CN Application No. 201680051713.8, filed Jul. 8, 2016, 14 pages.
Lee, P.J., et al., "Valve design for extracting response functions from hydraulic systems using pseudorandom binary signals," Journal of Hydraulic Engineering 134(6):858-864, Jun. 2008.

* cited by examiner

SYSTEM AND METHOD FOR GENERATION OF A PRESSURE SIGNAL

PRIORITY DOCUMENTS

The present application claims priority from Australian Provisional Patent Application No. 2015902731 titled "SYSTEM AND METHOD FOR GENERATION OF A PRESSURE SIGNAL" and filed on 10 Jul. 2015, the content of which is hereby incorporated by reference in its entirety.

INCORPORATION BY REFERENCE

The following publications are referred to in the present application and their contents are incorporated by reference in their entirety:

Gong, J., Zecchin, A. C., Simpson, A. R., and Lambert, M. F. (2014), "Frequency response diagram for pipeline leak detection: comparing the odd and the even harmonics", *J. Water Resour. Plan. Manage.* 140(1), 65-74;

Gong, J., Simpson, A. R., Lambert, M. F., and Zecchin, A. C. (2013b), "Determination of the linear frequency response of single pipelines using persistent transient excitation: a numerical investigation", *J. Hydraulic Res.* 51(6), 728-734; and Gong, J., Lambert, M. F., Zecchin, A. C., and Simpson, A. R. (2011), "Frequency response measurement of pipelines by using inverse-repeat binary sequences", Proc. Int. Conf. CCWI 2011: *Computing and Control for the Water Industry: Urban Water in Management—Challenges and Opportunities*, Exeter, UK, 883-888, D. A. Savic, Z. Kapelan, and D. Butler, eds., University of Exeter, Exeter, UK.

TECHNICAL FIELD

The present disclosure relates to the characterisation of pipeline systems. In a particular form, the present disclosure relates to the generation of a pressure signal in a pipeline system to assist in characterising the pipeline system.

BACKGROUND

Characterisation of pipeline systems may be carried out by determining the transient response of the system by measuring the fluctuation in pressure head at a given location following the injection of a transient pressure signal. This type of analysis depends on the shape of the input pressure signal. For each different type of input pressure signal event, a different transient response in time will result even though the state of the pipeline itself is unchanged. A more concise definition of the condition of the pipeline system may be determined through the extraction of its overall system response functions. These response functions describe the relationship between an input pressure signal and the resultant pressure response and illustrate how the system modifies the input signal as it propagates through the system.

The system response function in the frequency domain, known as the frequency response function, is of particular interest as it allows the study of the frequency dependent effects within the pipeline system. These effects can include the fluid-structure interaction, unsteady friction, and viscoelastic behaviour of a fluid-filled pipeline system. The system response function may also be used to detect faults, such as pipe wall deterioration, blockages and leaks, in a pipeline system, or to determine general pipeline system characteristics, such as pipeline class changes or the existence of pipe offtakes or branches. Unlike electrical and mechanical systems, the generation of a signal for extracting the frequency response function from a pipeline system such as water distribution system is difficult due to the high back pressure in the pipeline and the size and complexity of the system.

In order to conveniently determine the frequency response function over a number of frequencies in one operation, the input pressure signal should be composed of a number of different frequencies. One example of a wide bandwidth signal that may be employed is a single sharp pulse generated through the fast perturbation of a valve in the pipeline system. However, due to the back pressure in a typical pipeline and the limitation in their intrinsic manoeuvrability, typical mechanical valves are not capable of the fast actuation necessary to generate a pressure signal that is sufficiently sharp and further having the suitable high frequency content. Even if a sufficiently sharp pulse could be generated, the resulting pressure perturbation would need to be significant in magnitude in order to ensure that there is sufficient energy and a suitably high signal-to-noise ratio in not only the low frequency components, but also the high frequency components to achieve the appropriate bandwidth. Such a high magnitude for the incident pressure wave could potentially have a negative impact on the safe operation of the pipeline system.

One attempt to generate a wide bandwidth continuous pressure signal of low amplitude is the adoption of a pseudorandom binary sequence (PRBS). A PRBS is a predetermined and periodic two-level signal which has a spectrum similar to that of a single input pulse. A PRBS is usually represented by a sequence of digits with two different values. Each digit in the sequence is effective for a predetermined time period, and the switch between levels is only at predetermined certain event points. The periodicity provides the signal with a higher degree of noise tolerance, and the predetermination removes the statistical variability often associated with signals of a purely random nature. The continuous form of the PBRS also allows the energy of the signal to be distributed over a longer time frame, and the amplitude of the signal can be small while maintaining a wide signal bandwidth.

There have been some attempts to generate a pseudorandom binary pressure signal in a pipeline system in order to characterise the pipeline system based on a side discharge valve arrangement which is actuated to generate discrete pulses based on a maximum length (pseudorandom) binary sequence (MLBS). However, while this approach has led to some success in determining the system response of a pipeline, such a sequence of pulses is not a true PBRS. In addition, it has been difficult to generate suitably sharp individual pulses within the MLBS-based signal having the sufficient high frequency content.

SUMMARY

In a first aspect, the present disclosure provides a system for generating a pressure signal in a pipeline system containing a pressurised fluid, including:

a discharge valve in fluid communication with the pressurised fluid of the pipeline system to allow fluid from the pipeline system to discharge; and an electronic controller to dynamically control a degree of opening of the discharge valve to selectively vary the discharge valve between a plurality of valve opening states to generate the pressure signal in the pipeline.

In another form, the plurality of valve opening states includes a first valve opening state where the discharge valve is partially or completely closed and a second valve opening state where the discharge valve is partially or completely open.

In another form, the discharge valve is controlled to vary from the first valve opening state to the second valve opening state according to a time varying signal.

In another form, the time varying signal is a binary signal.

In another form, the binary signal is a pseudorandom binary sequence (PRBS).

In another form, the pseudorandom binary sequence is a maximum-length binary sequence (MLBS).

In another form, the pseudorandom binary sequence is an inverse-repeat binary sequence (IRS).

In another form, the difference between the first valve opening state and the second valve opening state is controlled to define an amplitude of the discharge valve.

In another form, the discharge valve is controlled to generate hydraulic noise between a plurality of selectable noise levels.

In another form, the discharge valve is controlled to vary between a plurality of valve opening states according to a periodic waveform.

In a second aspect, the present disclosure provides a discharge valve for a fluid conduit, the discharge valve dynamically controllable in accordance with a control signal to vary between a plurality of valve opening states, the discharge valve including:

an outer body;

a piston member reciprocally moveable within the outer body, the piston member having a valving end operable to interrupt the flow of fluid in the fluid conduit;

an actuating arrangement to drive the piston member in accordance with the control signal to vary the discharge valve between first valve opening state and the second valve opening state.

In another form, the plurality of valve opening states includes a first valve opening state where the fluid conduit is partially or completely closed and a second valve opening state where the fluid conduit is partially or completely open.

In another form, the actuating arrangement includes a first solenoid and associated return biasing means to drive the piston member to the first valve opening state and a second solenoid and associated return biasing means to drive the piston member to the second valve opening state.

In another form, a discharge valve transition time between the first valve opening state and the second valve opening state is of the order of 3 ms.

In another form, the discharge valve transitions between the first valve opening state to the second valve opening state according to a pseudorandom binary sequence.

In a third aspect, the present disclosure provides a system for determining the system response function of a pipeline system, including:

a discharge valve in fluid communication with the pressurised fluid of the pipeline system to allow fluid from the pipeline system to discharge; and an electronic controller to dynamically control a degree of opening of the discharge valve to selectively vary the discharge valve between a plurality of valve opening states to generate an input pressure signal in the pipeline;

one or more pressure measurement devices to measure a time varying pressure response signal resulting from an interaction of the input pressure signal with the pipeline system; and a data acquisition and processing system to determine the system response function of the pipeline system based on the measured time varying pressure response signal.

In another form, the electronic controller controls the discharge valve to vary between a first valve opening state where the discharge valve is partially or completely closed and a second valve opening state where the discharge valve is partially or completely open.

In another form, the electronic controller controls the discharge valve to transition between the first valve opening state to the second valve opening state according to a pseudorandom binary sequence.

In another form, the data acquisition and processing system determines the frequency response function of the pipeline system.

In another form, the data acquisition and processing system determines the impulse response function of the pipeline system.

In a fourth aspect, the present disclosure provides a method for generating an input pressure signal in a pipeline system containing a pressurised fluid, including:

providing a discharge valve in fluid communication with the pressurised fluid of the pipeline system to allow fluid from the pipeline system to discharge; and dynamically controlling a degree of opening of the discharge valve to selectively vary the discharge valve between a plurality of valve opening states to generate the input pressure signal in the pipeline.

BRIEF DESCRIPTION OF DRAWINGS

Embodiments of the present disclosure will be discussed with reference to the accompanying drawings wherein.

DESCRIPTION OF EMBODIMENTS

Figure 1:
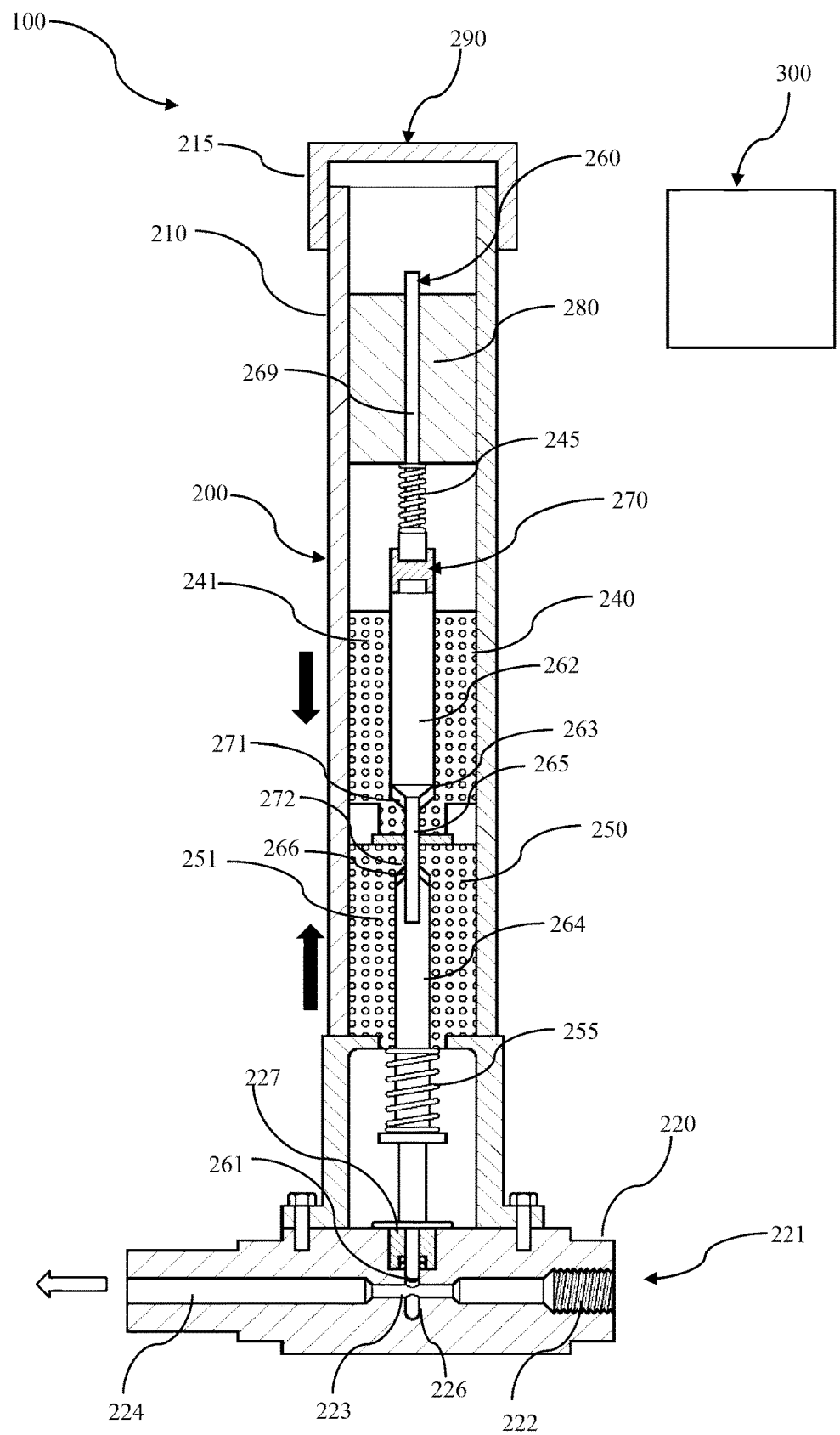
FIG. 1 is a system view diagram of a system for generating a pressure signal in a pipeline system according to an illustrative embodiment.

Referring now to FIG. 1, there is shown a system 100 for generating a pressure signal in a pipeline system in accordance with an illustrative embodiment. Pressure signal generating system 100 includes a discharge valve 200 and an electronic controller 300 to dynamically control a degree of opening of discharge valve 200 to selectively vary discharge valve 200 between a plurality of valve opening states to generate the pressure signal.

Discharge valve 200, shown in sectional view in FIG. 1, includes a valving arrangement 290 in the form of a generally cylindrical shape outer body 210 and a piston member 260 reciprocally moveable within outer body 210 in a complementary shaped piston cavity 270. Outer body 210 is connected at one end at right angles to an open ended outlet pipe section 220 which is connected to the pipeline system (not shown) and at the other end includes a removable cap 215.

Pipe section 220 conveys fluid from the pipeline system in the arrowed direction by a conduit 221 which tapers from an inlet section 222 to form a valve section 223 and then widens to form an outlet section 224 before eventual discharge of the fluid. In this illustrative embodiment, pipe section 220 is configured to be attached to a pipeline system involved in the utility scale transmission and distribution of water and to provide a reduced diameter valve section 223 as compared to the diameter of the pipeline system.

Intersecting the valve section 223 of outlet pipe section 220 at right angles is valving channel 226 which is arranged to receive the valving end 261 of piston member 260 which in this example may range in movement from being completely withdrawn from valve section 223, and as a result not interfering with the ability of fluid to discharge through pipe section 220, to being completely inserted into valving channel 226 and as a result completely blocking or interrupting outlet pipe section 220 to prevent any fluid flow.

In this illustrative embodiment, outlet pipe section 220 is formed from a block of suitably rigid material such as brass so as to provide a suitably stable platform which will be minimally affected by the high speed movement of piston member 260. To receive the valving end 261 of the piston member 260, a cylindrical bore 227 is formed in outlet pipe section 220 which terminates in a reduced diameter valving channel 226 as described previously.

In this way, valving arrangement 290 may be removably attached to outlet pipe section 220 by inserting valving end 261 into the valving channel 226 and attaching outer body 210 of valving arrangement 290 to outlet pipe section 220 such as by bolting arrangements or the like. As would be appreciated, the use of suitable sealing means such as O-ring seals and lubricants may be employed to assist in forming a fluid tight seal between the various components of discharge valve 200.

Valving arrangement 290 includes an actuating arrangement including a first solenoid 240 and an associated return biasing means in the form of a compression spring 245 operable to control a closing characteristic of the discharge valve 200. First solenoid 240 includes a coil element 241 configured to surround a first plunger section 262 of piston member 260 which includes a tapered lower end 263 which abuts a first complementary tapered abutment portion 271 of piston cavity 270 to check the downward closing motion of piston member 260.

Valving arrangement 290 further includes a second solenoid 250 and associated return biasing means in the form of a spring 255 operable to control an opening characteristic of the discharge valve 200. Second solenoid 250 includes a coil element 251 configured to surround a second plunger section 264 of piston member 260 which is connected to first plunger section 262 by connecting rod 265. Second plunger section 264 includes a tapered upper end 266 which abuts a second complementary tapered abutment portion 272 of piston cavity 270 to check the upward opening motion of piston member 260 in operation.

Throughout the specification the term "pipeline system" is taken to mean the pipeline and associated connected hydraulic components and features. Hydraulic components include, but are not limited to, various types of valves such as inline valves (partially or fully closed), scour valves and air valves; closed and open branch pipeline sections extending from the pipeline; off-takes; reservoirs; and tanks (eg, surge tanks). Hydraulic features include, but are not limited to, changes in pipeline material, diameter or class.

In this illustrative embodiment, pressure signal generating system 100 also includes a valve opening state measurement device 280 for measuring the state of discharge valve 200. In this example, valve opening state measurement device 280 is a linear voltage displacement transducer (LVDT) which receives the upper end 269 of piston member 260 which is formed of a suitable ferromagnetic material. LVDT 280 then functions to measure the displacement or movement of piston member 260 and hence the variation in the valve opening state of the discharge valve 200.

Figure 2:
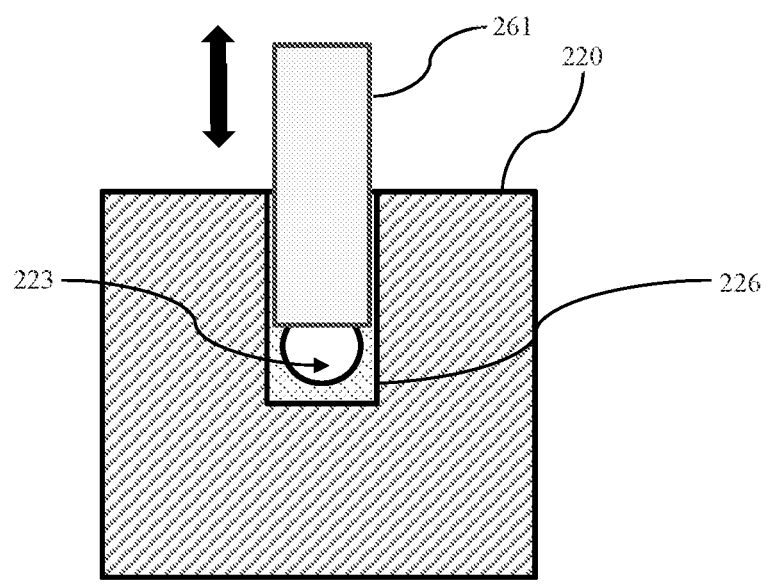
FIG. 2 is an enlarged side sectional view of the discharge valve illustrated in FIG. 1.

Referring now to FIG. 2, there is shown an enlarged sectional view of outlet pipe section 220 sectioned where the valving end 261 of piston member 260 moves vertically in valving channel 226 to interrupt fluid flow through the valve section 223 of outlet pipe section 220. In this illustrative embodiment, valving end 261 of piston member 260 is of a rod configuration having a 3 mm diameter which slidably moves within valving channel 226 also having a diameter of 3 mm in combination with a valve section 223 of outlet pipe section 220 having a 2 mm diameter.

The calibrated equivalent opening of the valve ($C_dA_V$) is $2.7\times10^{-6}$ m$^2$ when fully open where $A_v$ is the area of the valve opening in m$^2$ and $C_d$ is the coefficient of discharge for discharge valve 200. This value is obtained by noting that the discharge though an orifice or valve $Q_v$ is dependent on the pressure difference $\Delta H_V$ between the two sides of the orifice, the size of the orifice $A_V$ and the discharge coefficient $C_d$. The relevant control equation is $Q_V = C_d A_V \sqrt{2g\Delta H_V}$ and so the quantity $C_d A_V$ may be calibrated or determined by experimentally determining $Q_V$ and $\Delta H_V$.

As would be appreciated, in accordance with the above embodiment, the size of the opening of the side discharge valve would generally be quite small compared to the cross sectional area of a typical municipal water pipeline as is the case here. This assists in reducing the effects that discharge valve 200 may have on the system response function of the pipeline system being characterised.

Some factors that may be considered in determining the size of the valve opening include, but are not limited to, maintaining the impedance of the valve (for the mean opening of the perturbation) greater than the impedance of the pipeline so that the valve functions as a high loss valve to highlight the resonant responses of the pipeline system and reduce any anti-resonant responses. Another factor that may be considered is to reduce of the amount of discharge of the valve so that its effect is small compared to the overall pipeline system. Further information of assistance in relation to these considerations may be found in Gong, J., Zecchin, A. C., Simpson, A. R., and Lambert, M. F. (2014), "Frequency response diagram for pipeline leak detection: comparing the odd and the even harmonics", *J. Water Resour. Plan. Manage.* 140(1), 65-74, the contents of which are incorporated in this specification by reference in their entirety.

In this illustrative embodiment, electronic controller 300 is a customised electronic device that generates electric signals that activate the solenoids 240 and 250 to drive the piston member 260 to, and maintain the piston member 260 at, predetermined locations corresponding to particular valve opening states of discharge valve 200. As will be discussed below, the movement patterns in one embodiment may be maximum length binary sequence (MLBS) and inverse repeat sequence (IRS) type binary sequences. In one example, the binary sequences are produced using hardware implemented shift registers. In another embodiment, the binary sequences may be generated from a programmable chip or alternatively from electronic componentry driven by a personal computer or similar.

As would be appreciated, the ability to both control opening and closing characteristics of the discharge valve 200 allows for a wider variety of pressure signals to be generated. In one non-limiting example, the degree of opening of the discharge valve that defines the open state of the discharge valve may be defined by limiting the maximum upward or opening movement of piston member. Similarly, the degree of opening of the discharge valve that defines the closed state of the discharge valve may be defined by limiting the maximum downward or closing movement of piston member.

In one non-limiting example, a pressure signal may be generated according to a time varying binary signal. A time varying binary signal is characterised by a signal that changes instantaneously between two states. One example of a time varying binary signal is a pseudorandom binary sequence PRBS. An example of a PRBS is a maximum-length binary sequence (MLBS) generated by an n-stage shift register, with "exclusive or" (XOR) feedback from the last stage and one or more of the other stages to the first stage, where feedback is chosen to achieve the maximum length $N=2^n-1$.

The period of an MLBS signal is $NT_c$, where $T_c$ is the time interval of the clock pulses. The auto-correlation and cross-correlation (with the output signal) properties of MLBS are similar to those of white noise. An MLBS signal is a broad-band signal. While a small part of its power is located at frequency zero, most of the power spreads over a fundamental frequency of $f_c/N$ and its harmonics, where $f_c$ is the frequency of the clock ($f_c=1/T_c$). The power drops towards zero at the generation clock frequency $f_c$ and its harmonics. When the power drops to half of the maximum value (−3 dB), the corresponding frequency is 0.443 $f_c$, which is typically defined as the bandwidth of an MLBS signal.

Figure 3:
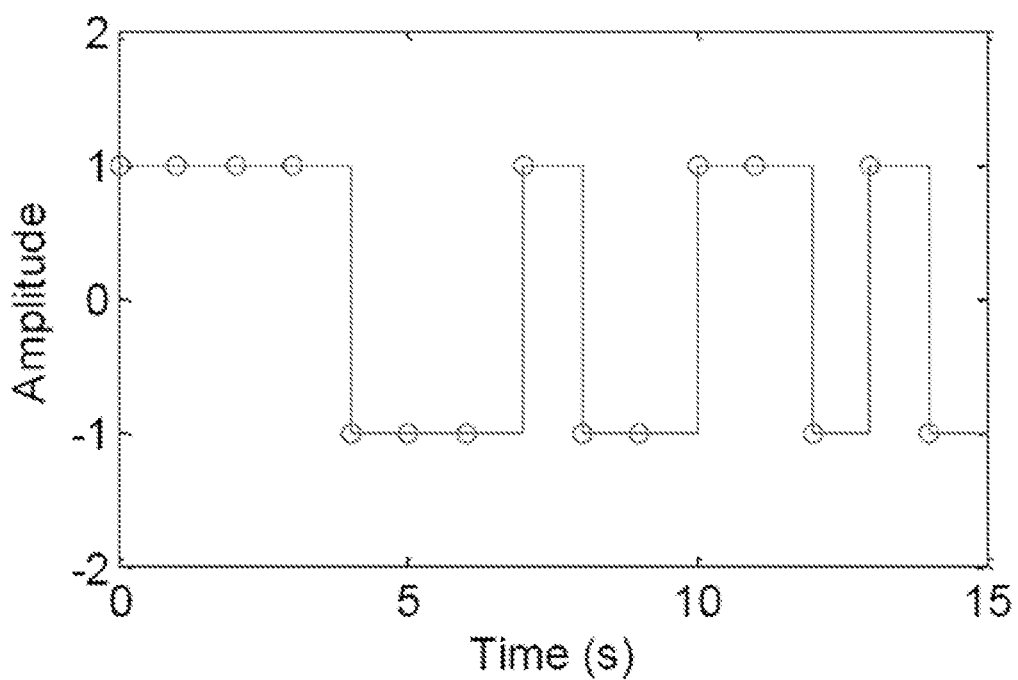
FIG. 3 is a graph of an example continuous pseudorandom binary sequence where the circles represent the digital value and the line represents the signal.
Figure 4:
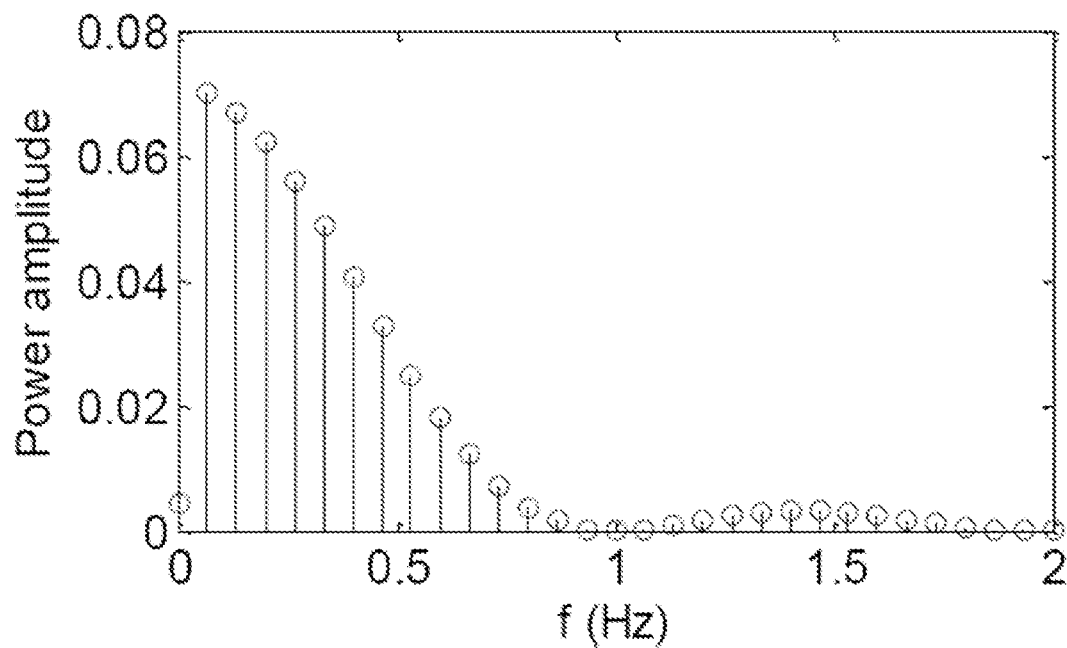
FIG. 4 is a graph of the power spectrum of the pseudorandom binary sequence illustrated in FIG. 3.

Referring now to FIG. 3, there is shown a portion of an example MLBS signal generated from a 4-stage shift register ($f_c=1$ Hz) where the logical outputs 1 and 0 are mapped to +1 and −1 (that are dimensionless), respectively. In FIG. 4 there is shown the power spectrum of the MLBS signal illustrated in FIG. 3.

Figure 5:
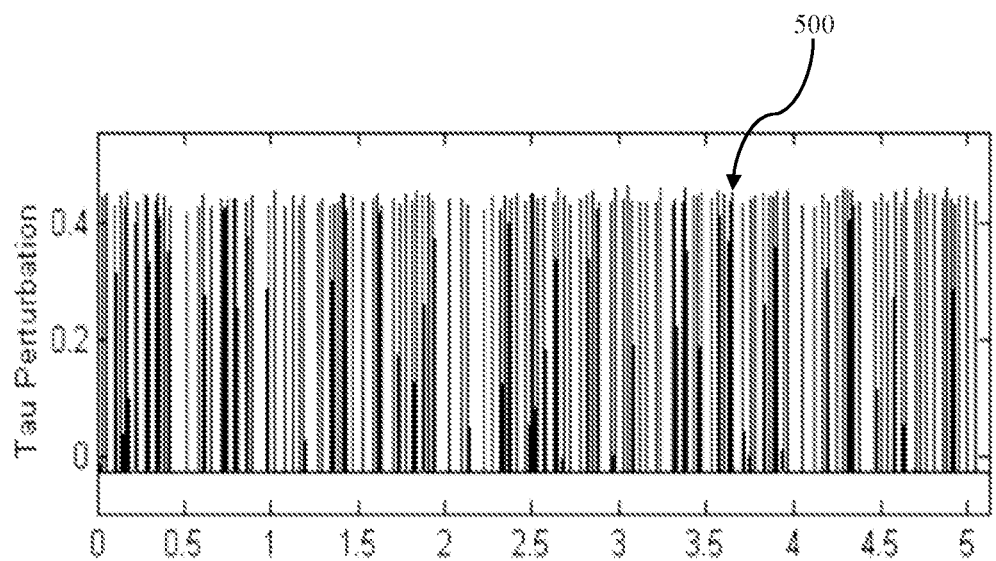
FIG. 5 is a graph of the variation in valve opening state corresponding to the generation of discrete pulses according to a discrete pseudorandom binary sequence.

FIG. 5 is a plot of the variation in the equivalent dimensionless valve opening coefficient τ 500 (referred to here as τ perturbation) or valve opening state as a function of time of an earlier attempt at generating a pressure signal according to a time varying binary signal using a prior art discharge valve type arrangement (eg, see Lee et al, "Valve Design for Extracting Response Functions from Hydraulic Systems Using Pseudorandom Binary Signals", *Journal of Hydraulic Engineering*, Vol. 134, No. 6, June 2008, pp. 858-864).

Dimensionless valve opening coefficient τ is defined as $\tau = C_d A_V (C_d A_V)_s$ where the subscript s represents the reference value and corresponds to the degree of opening of discharge valve 200. As such, the τ perturbation is determined by the valve opening state measurement device 280 which as described previously is a LVDT measuring the movement of piston member 260 which corresponds to the input pressure signal being generated.

Figure 6:
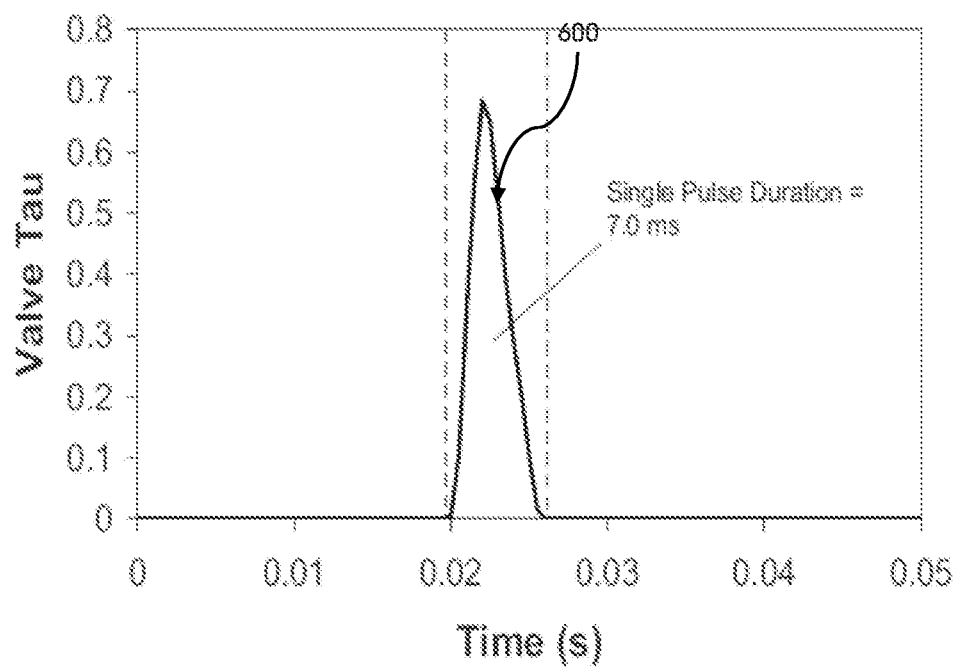
FIG. 6 is a graph of the pulse shape of an individual pulse from the sequence of pulses illustrated in FIG. 5.

In this case, the time varying binary signal is a MLBS type signal as described above, although not necessarily corresponding to the MLBS signal illustrated in FIG. 4. As would be appreciated, τ perturbation 500 only corresponds to discrete pulses resulting from the discharge valve being actuated for a short period of time as shown by pulse shape 600 depicted in FIG. 6 which corresponds to each of the discrete pulses of the τ perturbation sequence 500.

As can be seen, the variation in the equivalent dimensionless valve opening coefficient τ 500 or τ perturbation shown in FIG. 5 corresponding to earlier arrangements is a sequence that consists of discrete pulses rather than a true MLBS signal which is continuous due to the signal maintaining its level between transitions as best seen in FIG. 3. This has affected the useability of this type of discrete pulse pressure signal sequences as the relevant signal processing theory assumes a continuous MLBS signal and the spectrum and the autocorrelation of the sequence of discrete pulses are different from, and not as desirable as, those of a continuous MLBS for the purpose of system identification.

In another example, the PBRS is an inverse-repeat binary sequence (IRS). An IRS signal may be obtained by inverting every other digit of an MLBS signal such as that illustrated in FIG. 3. Accordingly, the period of an IRS signal is two times the length of the corresponding MLBS, and within one period, the second half is the negative of the first half (anti-symmetric). The power distributes at a fundamental frequency of $f_c/(2N)$ (which is half the fundamental frequency of the corresponding MLBS) and its odd harmonics (with extra power reductions at $f_c/2$ and its odd harmonics). There is no power at frequency zero, and the power drops towards zero at the generation frequency $f_c$ and its harmonics.

An IRS signal may be advantageously employed to suppress the effects of nonlinearities in pipeline systems due to its anti-symmetric properties which result in the cancelling of the majority effects of non-linear responses in the process of determining the system linear FRF. Non-linear transient responses originate from non-linear hydraulic phenomenon such as unsteady friction and non-linear hydraulic components such as leaks or orifices. Oscillating valves are similar to orifices in that they are non-linear hydraulic devices as the relationship between the flow and the pressure loss through the valve is not linear. However, linearisation is used to model oscillating valves in the analysis of fluid transients using linear frequency-domain techniques such as the transfer matrix method.

The difference between the true behaviour and the linearised behaviour of an oscillating valve may be defined as the 'linearisation error', which is proportional to the relative amplitude of the valve oscillation (relative to the mean opening). This 'linearisation error' may affect the accuracy of the FRF determination, which employs linear system theory. This would typically indicate that the relative amplitude of valve oscillation is kept small to avoid significant 'linearisation error' and its negative effects in FRF determination. However, the use of IRS enables greater relative valve oscillation without necessarily reducing the accuracy of FRF determination.

This leads to two potential benefits of using an IRS for FRF determination where non-linear responses are significant. The first is that due to the anti-symmetric properties of IRS, the majority of the non-linear effects, including those from the 'linearisation error', are cancelled out in the determination of the system linear FRF. The second is that the greater valve oscillation available relative to other techniques will increase the signal-to-noise ratio and as a result enhance the FRF determination. As a result, the IRS is more suitable for the FRF determination of pipeline systems especially.

Figure 7:
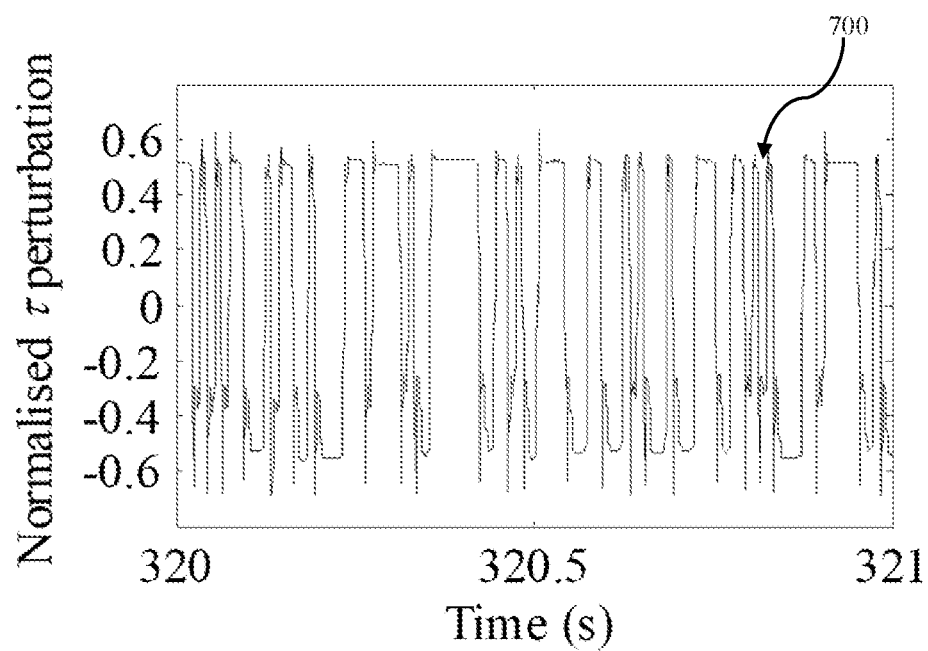
FIG. 7 is a graph of the variation in valve opening state or dimensionless valve opening position designated as the $\tau$ perturbation corresponding to the generation of a continuous pressure signal based on a continuous pseudorandom binary signal according to an illustrative embodiment for an amplitude ($A_{in}$) approximately 0.5.

Further discussions of these aspects and their application may be found in Gong, J., Simpson, A. R., Lambert, M. F., and Zecchin, A. C. (2013b), "Determination of the linear frequency response of single pipelines using persistent transient excitation: a numerical investigation", *J. Hydraulic Res.* 51(6), 728-734 and Gong, J., Lambert, M. F., Zecchin, A. C., and Simpson, A. R. (2011), "Frequency response measurement of pipelines by using inverse-repeat binary sequences", Proc. Int. Conf. CCWI 2011: *Computing and Control for the Water Industry: Urban Water in Management—Challenges and Opportunities*, Exeter, UK, 883-888, D. A. Savic, Z. Kapelan, and D. Butler, eds., University of Exeter, Exeter UK, the contents of which are incorporated in this specification by reference in their entirety, Referring now to FIG. 7, there is shown the normalised or dimensionless τ perturbation 700 of a pressure signal generating system such as that illustrated in FIG. 1 according to an illustrative embodiment. In this example, normalised τ perturbation 700 is a continuous IRS signal. As depicted in FIG. 7, the normalised τ perturbation is defined as $(\tau - \tau_0)/\tau_0$ where $\tau_0$ is the average value of τ during the steady oscillatory condition and corresponds to the mean opening of the valve. As such, $(\tau - \tau_0)/\tau_0$ corresponds to the input signal that excites the pipeline system. The normalised τ perturbation is determined from the measured displacement of piston member 260 by LVDT 280 during the generation of the pressure signal. In addition, the normalised amplitude of the valve oscillation, $A_{in} = \max(\tau - \tau_0)/\tau_0$, may be defined. This parameter may be adjusted by varying the maximum displacement of the valving end 261.

In this illustrative embodiment, valving end 261 is threadably connected to piston member 260 allowing valving end 261 to be screwed further on to piston member as a result adjusting its effective length and the position of its lowest end and changing the effective stroke of the valving end 261 and the amplitude of the discharge valve movement.

Taking the pressure signal generating system 100 depicted in FIG. 1 as an example, the first solenoid 240 in accordance with a control signal from controller 300 functions to drive piston member 260 and in turn valving end 261 in one direction to close valve section 223 to first valve opening state where discharge valve 200 is in a partially or completely closed position while second solenoid 250 in accordance with a control signal from controller 300 drives piston member 260 in the opposite direction to a second valve opening state where discharge valve 200 is partially or completely open. In the generation of the excitation signal corresponding to a binary signal, such as the MLBS signal illustrated in FIG. 3, only one of solenoids 240, 250 is activated resulting in the binary state being maintained when the respective solenoid is activated.

As well as providing dynamic control over the degree of opening of the discharge valve 200 to selectively vary the discharge valve between, in this example, a substantially open state to a partially closed state, the valving arrangement 290 provides a response time that is much shorter than a single solenoid system having a single return spring. As an example, the maximum response time (the time for the piston member 260 to travel the full stroke of 2.5 mm) is approximately 3 ms, ie, the discharge valve is able to transition between valve opening states within timings of the order of 3 ms.

As has been described previously, the piston member 260 may be driven to a completely or partially closed position to define one of the valve opening states of discharge valve 200 and similarly the piston member 260 may be driven to a completely or partially open position to define the second valve opening state of the discharge valve. In this manner, the amplitude of the discharge valve movement may be varied to alter the amplitude of the pressure signal being generated. In the case shown in FIG. 7, discharge valve 200 oscillates between an open state where the discharge valve is fully open to a partially closed state where the discharge valve is not fully closed. As would be appreciated, fully closing discharge valve 200 may, depending on the configuration, introduce increased pressure variation in the pipeline system resulting in the potential of a non-linear response from the pipeline system.

In the case of a binary signal such as a PRBS or IRS signal, the piston member 260 moves only when there is a shift in the binary value of the sequence. When the binary sequence changes from 1 to 0, the solenoid 240 drives the valve arrangement 290 from fully open to partially closed and the discharge valve 200 remains partially closed until the binary value changes back to 1, which triggers the solenoid 250 to open the discharge valve 200 fully. As an example, if the binary sequence is '1101', the discharge valve 200 will remain open for the first two clock cycles, become partially closed in the third clock cycle and then open and remain open until another '0' is encountered.

As would be appreciated, the present method and system is not confined to the generation of an excitation signal based on a binary signal, but can be configured to generate signals having a variety of waveforms by dynamically controlling the degree of opening of discharge valve 200 to vary the discharge valve between multiple valve opening states to generate a pressure wave having the desired signature. While pressure signal generating system 100 is principally directed to the generation of a binary signal, other embodiments where rapid transitions are not necessarily required may be based on an electronic linear actuator, stepper motor, voice coil or equivalent electronic actuating device to change the position of piston member 260 and as a result control the degree of opening of the discharge valve to selectively vary the discharge valve between a plurality of valve opening states.

In one embodiment, periodic waveforms having a predetermined frequency and amplitude may be generated by employing a number of valve opening states corresponding to locations on the waveform. In one example, the number of valve opening states may be increased to effect a substantially smoothly varying signal as required. Examples of periodic waveforms include, but are not limited to, sinusoidal, triangular, square or sawtooth. In another example, the periodic waveform may be comprised of a non-regular shape that is repeated. The selection of the waveforms depends on the application and the property of the pipeline system. In one non-limiting example, sinusoidal waves would be selected to extract the frequency response at specific frequencies. In another example, customised waveforms may be designed to excite only selected resonant frequencies of a pipeline system In another embodiment, an excitation signal having a non-periodic waveform such as a chirp may be generated.

In yet another embodiment, a pressure signal may be generated that reproduces or corresponds to hydraulic noise that would typically be encountered in the pipeline system. A partially open valve is similar to a leak and will introduce hydraulic noise (in the form of wide-band stationary pressure signals) in the pipeline system. The hydraulic noise may be used to conduct system identification of the pipeline system. In this example, pressure signal generating system 100 may be configured to generate hydraulic noise between a plurality of selectable noise levels corresponding to the different valve opening states.

The present method and system may be combined with a pressure measuring device located on the pipeline system to measure the variation in pressure caused by the generated excitation signal. In one example, the resulting pressure variation in the pipeline system may be measured substantially at the same location where the discharge valve 200 is located by the use of a pressure transducer fitted to the pipeline system.

The Applicant has conducted a number of experiments to verify the effectiveness of the above pressure signal generating system to the task of characterising the frequency response function (FRF) of a pipeline system.

Figure 8:
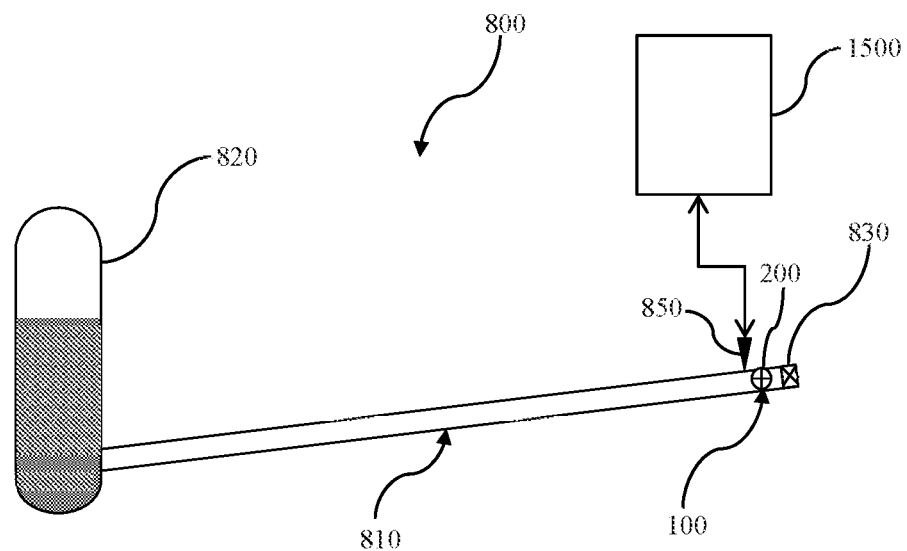
FIG. 8 is a schematic diagram of a pipeline system upon which experimental studies were conducted.

Referring now to FIG. 8, there is shown a schematic diagram of a pipeline system 800 including a pipeline 810 which in this example is made of copper and has a length of 37.5 in and an internal diameter of 22 mm. Pipeline 810 is bounded by a closed in-line valve 830 at one end and a pressurised tank 820 with a head of 38.50 m at the other end, forming a reservoir-pipeline-valve (RPV) type pipeline system. For a RPV system, the upstream side of the valve is the optimal excitation and observation point. Pressure signal generating system 100 is located 145 mm upstream from the closed in-line valve 830 having an elevation of 2.0 m above the upstream end of the pipeline.

The head or pressure response of pipeline system 800 is measured upstream of pressure signal generating system 100 by pressure transducer 850 which in this example is a Druck™ PDCR 810 pressure transducer mounted on pipeline 810 through a brass block inserted within the pipe system. The sensing surface of the pressure transducer 850 is attached to the water and flush to the inner pipe wall of pipeline 810. The measured output of the pressure transducer 850 is connected to data acquisition and processing system 1500 which in this embodiment includes a customised amplifier and data acquisition card (not shown) which in this example is a Measurement Computing™ USB-1608FS. The output of the valve opening state measurement device or LVDT of pressure signal generating system 100 is also recorded by the data acquisition card. The data acquisition is controlled by LabView™ software installed on a laptop computer and occurs with a sampling frequency of 5 kHz. As would be appreciated, other customised data processing and acquisition setups may be employed.

Three case studies were conducted with pipeline system 800 employing a range of amplitudes of the relative dimensionless valve perturbation or discharge valve amplitude, $A_{in}$. In each case study, both the MLBS and the IRS input signals were used, and the experimental FRF of the pipeline was estimated and compared with the theoretical linear theory FRF determined from the transfer matrix method. The repeatability was confirmed by conducting multiple tests in each case study. In this example, when the side discharge valve 200 of pressure signal generating system 100 was fully open, the steady-state flow through discharge valve 200 was $7.4 \times 10^{-5}$ m$^3$/s equivalent to a Reynolds number of approximately 4268 implying a flow regime corresponding to smooth pipe turbulent flow. As a result, a frequency-domain unsteady friction model was used in the numerical simulations to derive the theoretical FRF.

In the experimental study conducted, each individual trial lasted for 10 minutes. The first few seconds of data were measured under steady state (with discharge valve 200 open) to observe the initial steady-state head variation of the system. Then the IRS, or MLBS excitation signal generation was commenced. In this example, the MLBS signal was generated by a 10-stage shift register based on a clock frequency of 100 Hz resulting in a period of 10.23 s. The IRS is obtained by doubling the MLBS and reversing every other digit, so that the period of the IRS is 20.46 s. The bandwidth of the MLBS and the IRS (where the power of the signal drops to half the maximum) are both 44.3 Hz.

The pressure in the pressurised tank 820 became relatively stable after approximately 150 s of the start of the IRS or MLBS pressure signal generation. This is the time needed for the pressure regulator on the tank, which maintains the pressure in the tank to a predefined value by inputting and releasing compressed air, to adapt to the new condition imposed by the operation of discharge valve 200 in producing the IRS or MLBS signal. As a result, in the process of the experimental FRF estimation, the first 245.52 s of data in each test, equivalent to 24 periods of MLBS or 12 periods of IRS), were removed to ensure that the data used in FRF calculation were under steady oscillatory flow conditions.

Case Study No. 1—Input Pressure Signal Amplitude $A_{in} \approx 0.5$

Water discharge from the discharge valve 200 was measured using a volumetric method during each test. In this case study, the steady-state discharge when the valve was at its most closed position was $2.7 \times 10^{-5}$ m³/s, and the mean discharge out of the valve during MLBS or IRS excitation was measured as $4.8 \times 10^{-5}$ m³/s. The Darcy-Weisbach friction factor characterising the friction losses in the pipeline flow was estimated as 0.04 by the mean discharge and this figure was used in the determination of the theoretical linear FRF using the transfer matrix method.

Figure 9:
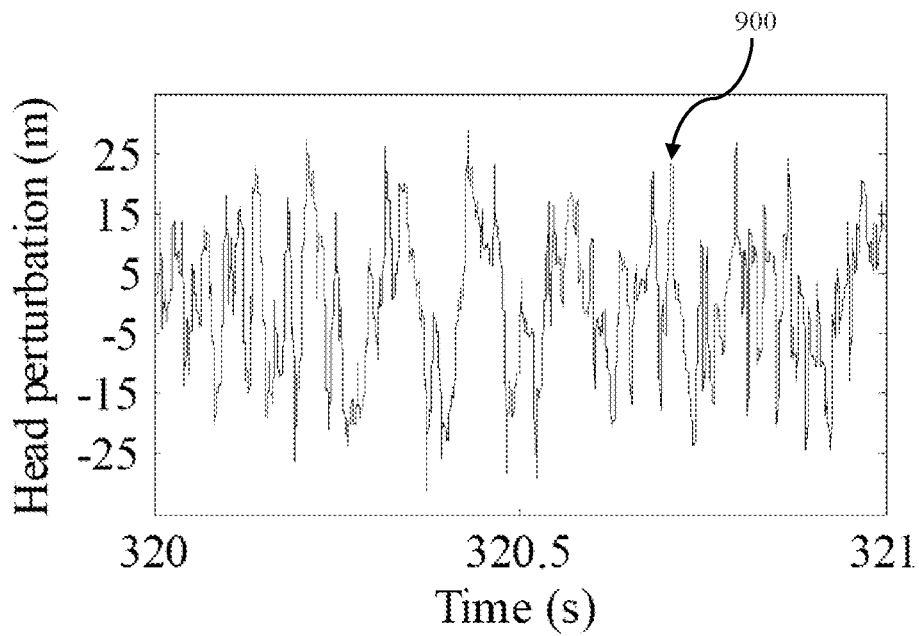
FIG. 9 is a graph of the measured head perturbation or output pressure signal corresponding to the normalised $\tau$ perturbation illustrated in FIG. 7 for the pipeline system illustrated in FIG. 8.

The normalised IRS τ perturbation 700 (ie, corresponding to the input excitation signal) for this case is shown in FIG. 7 and the corresponding head perturbation (measured output pressure) 900 is shown in FIG. 9. As can be seen, the measured valve perturbation 700 depicted in FIG. 7 follows an IRS pattern, but with small variations due to the mechanics of discharge valve 200. These small variations are considered as part of the input signal in the FRF determination so the effects resulting from them are not significant. The measured head response 900 shows little visible structure in the time domain, and the maximum magnitude is approximate ±28 in.

Figure 10:
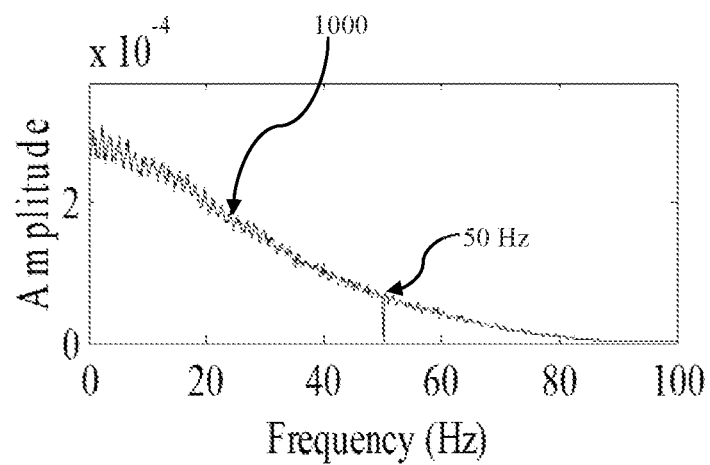
FIG. 10 is a graph of the power spectrum of the normalised $\tau$ perturbation illustrated in FIG. 7.
Figure 11:
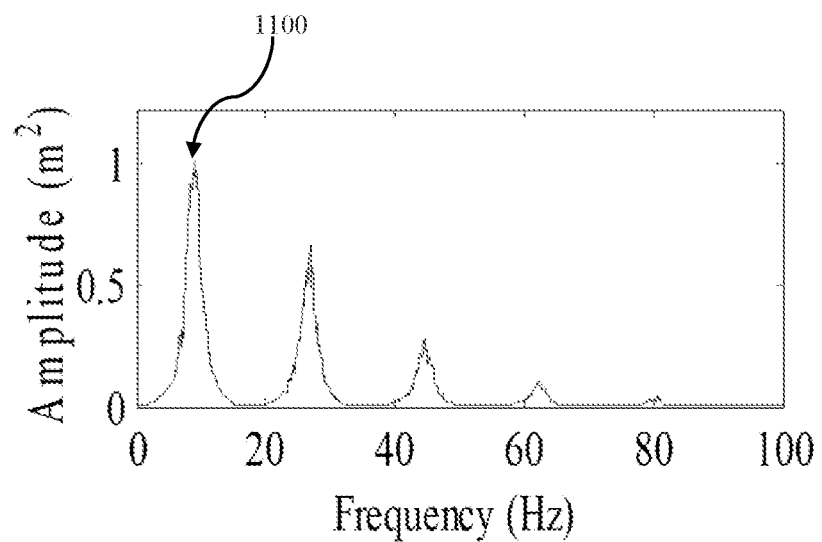
FIG. 11 is a graph of the power spectrum of the measured head perturbation illustrated in FIG. 9.

Referring now to FIG. 10, there is shown the power spectrum 1000 of the normalised τ perturbation 700 showing the frequency components included and their strength. Note that, for an IRS signal, theoretically the power goes to zero at half the clock frequency. As can be seen, the measured power spectrum 1000 is very low at 50 Hz (clock frequency is 100 Hz), which is consistent with theory. FIG. 11, shows the power spectrum 1100 of the measured output pressure 900 and demonstrates that the frequency response of pipeline system 800 reaches peaks at the odd harmonics of the fundamental frequency and further that the responses at the first three harmonics are relatively strong.

Figure 12:
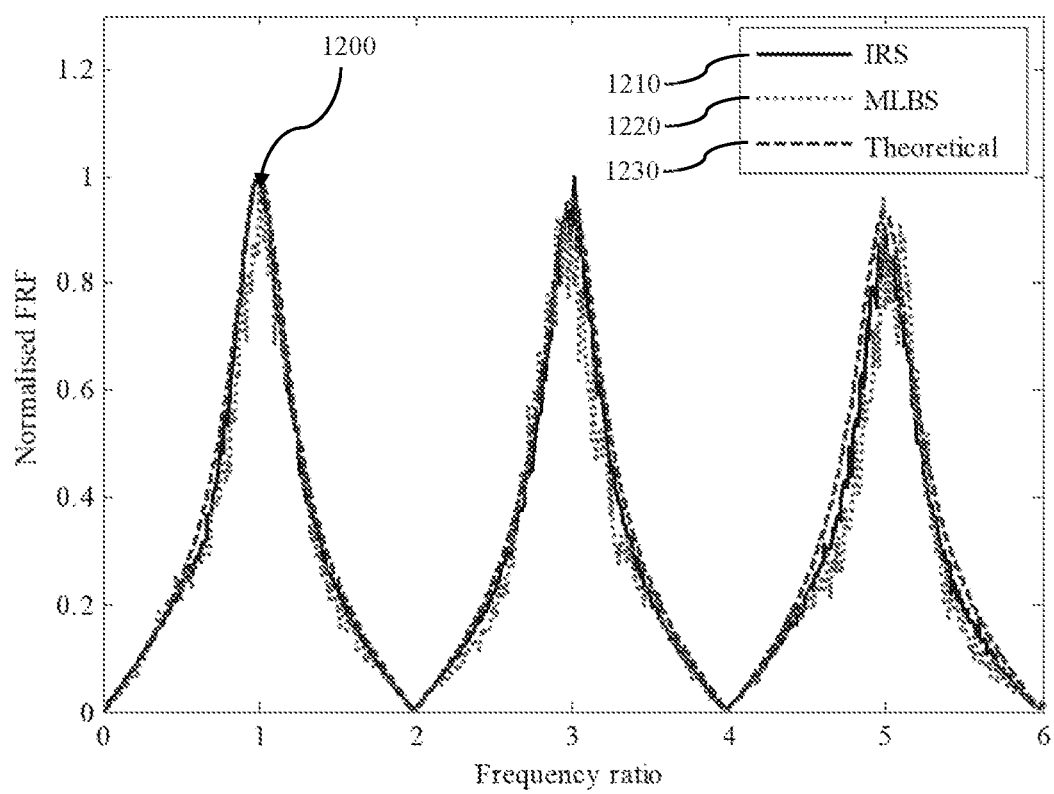
FIG. 12 is a plot of a comparison between the determined frequency response function (FRF) resulting from the generated inverse repeat sequence (IRS) and maximum length binary sequence (MLBS) excitation signals with the theoretical FRF for the measured head perturbation illustrated in FIG. 9.

Referring now to FIG. 12, there is a shown a comparison plot 1200 of the pipeline system FRF determined using linear systems theory from the data measured in the IRS 1210 and the MLBS 1220 experiments as compared to the theoretical linear system FRF 1230. Each FRF is normalised by dividing it by the corresponding peak value around the first resonant frequency. The horizontal axis is normalised by dividing the frequency values by the fundamental frequency of the pipeline system 800, estimated as 8.94 Hz from the extracted FRF.

As is apparent from FIG. 12, the experimental FRF results 1210, 1220 show significant variations when compared with the smooth theoretical linear FRF 1230. In the experimental FRF determined from MLBS 1220, the third peak is greater than the second peak, while the theoretical FRF shows that the third peak should be the smallest one. This is important as the relative sizes of the resonant responses are important in FRF-based pipeline leak or blockage detection. Experimental FRF with such a degree of variation would as a result be expected to reduce the effectiveness of this setup in fault detection. A major source of these variations is attributed to the nonlinearity associated with the pressure signal generation system 100. In this case study, the amplitude of the normalised τ perturbation ($A_{in}$) is approximately 0.5, which is expected to introduce a significant linearisation error in the linearised frequency-domain analysis because the linearised transfer matrix for an oscillating valve is just first-order accurate for small valve perturbations given that $A_{in}$ is far less than 1.

As can be determined by inspection of FIG. 12, the FRF determined from the generated IRS signal (ie, 1210) is much smoother when compared with that obtained from the generated MLBS signal (ie, 1220) using the same experimental apparatus and the same FRF calculation algorithm. In addition, the resonant frequencies in the FRF from the IRS signal are closer to the expected theoretical resonant frequencies.

As discussed previously, the only difference in the input pressure signal is that the IRS signal is anti-symmetric while the MLBS is not. The discrepancy between the two experimental FRFs indicates that the properties of the input signal can influence the eventual FRF extracted for the pipeline system and further that in these circumstances that the IRS signal is better in estimating the linear system FRF of a pipeline system.

Case Study No. 2: Input Pressure Signal Amplitude $A_{In} \approx 0.2$

Figure 13:
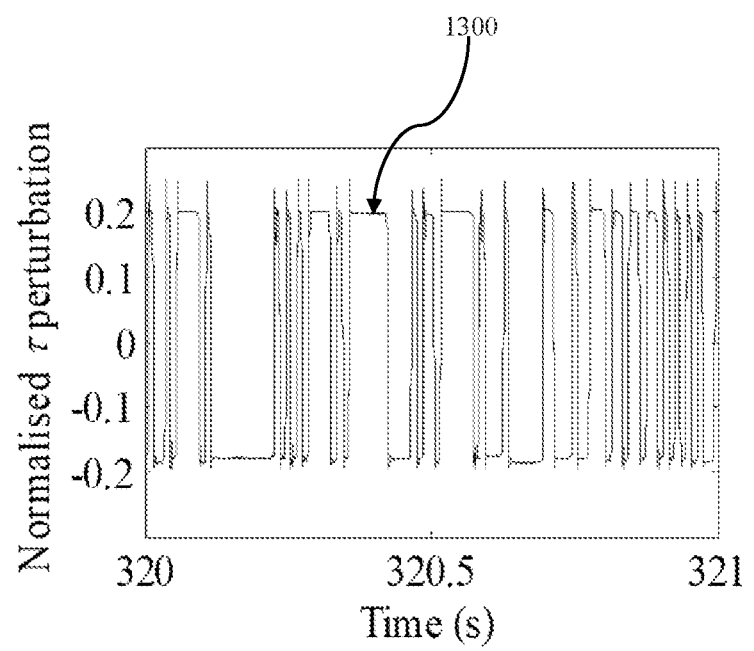
FIG. 13 is a graph of the variation in valve opening state or normalised τ perturbation corresponding to the generation of a pressure signal based on a continuous pseudorandom binary sequence according to an illustrative embodiment for $A_{in} \approx 0.2$.

In the second case study, the maximum allowable displacement of the piston member 260 in the discharge valve 200 of pressure signal generating system 100 was reduced to lessen the expected nonlinear effects. The steady-state discharge when discharge valve 200 was at its most closed position was $5.9 \times 10^{-5}$ m³/s, and the mean discharge out of the valve was $6.5 \times 10^{-5}$ m³/s under steady-oscillatory flow condition. The Darcy-Weisbach friction factor was 0.041. Sections of the normalised IRS r perturbation (input pressure signal) 1300 and the corresponding measured variation in head (output pressure signal) 1400 for this setup are shown in FIGS. 13 and 14 respectively.

Figure 14:
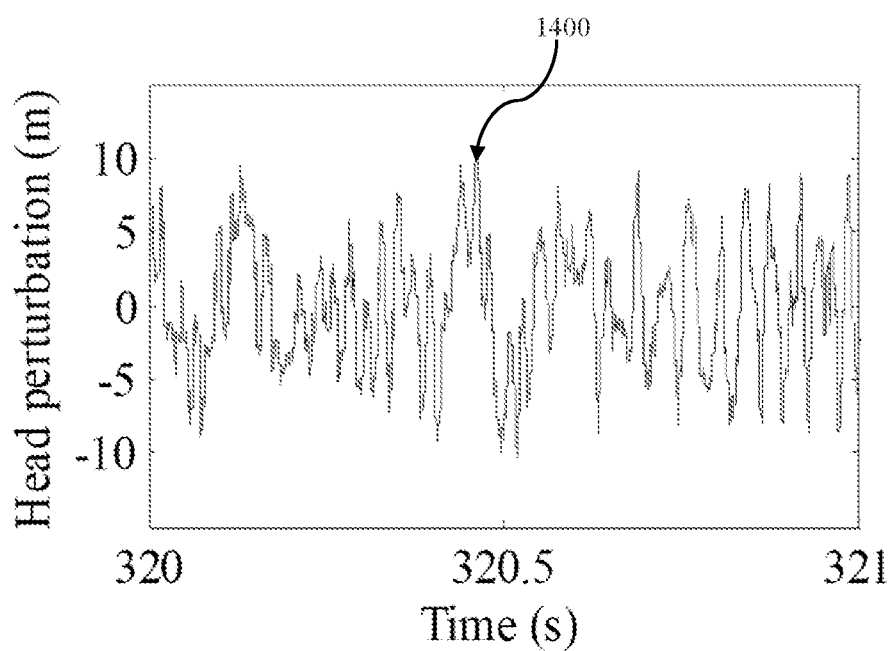
FIG. 14 is a graph of the measured head perturbation or output pressure signal corresponding to the normalised τ perturbation illustrated in FIG. 13 for the pipeline system illustrated in FIG. 8.

As can be seen from FIG. 14, the maximum magnitude of the head perturbation 1400 was decreased to approximately ±11 m, clearly indicating that the magnitude of the head perturbation under PRBS excitation such as through the use of an input IRS or MLBS signal is controllable by varying the value of $A_{in}$. Accordingly, $A_{in}$ is a parameter that may be adjusted to reduce the risk of damaging the pipeline system being characterised.

Figure 15:
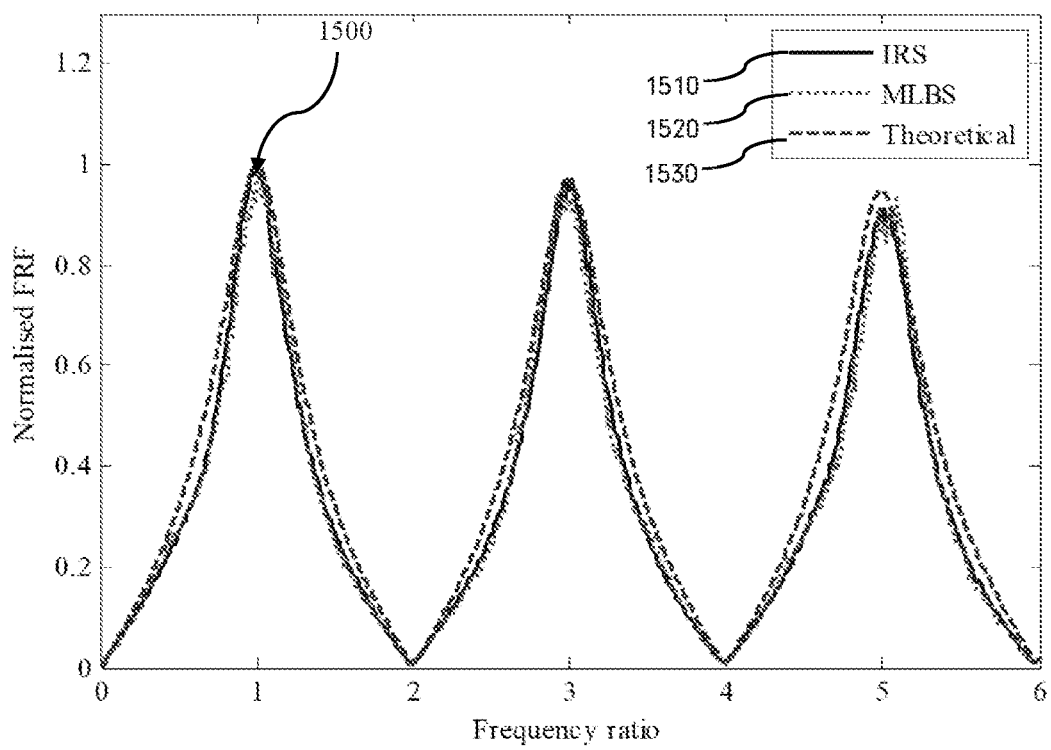
FIG. 15 is a plot of a comparison between the determined FRF resulting from the generated IRS and MLBS excitation signals with the theoretical FRF for the measured head perturbation illustrated in FIG. 14.

The experimental FRF induced by the IRS signal 1510 and the MLBS signal 1520 are determined and compared with the theoretical linear FRF 1530 in the comparison plot 1500 shown in FIG. 15 similar to FIG. 12. The amplitude of valve oscillation in Case Study No. 2 is much smaller than that in Case Study No. 1 and it would be expected from theoretical considerations that the nonlinearity induced by discharge valve 200 should be smaller. The results of Case No. 2 as shown in FIG. 15 show that both the experimental FRFs (ie, IRS 1510 and MLBS 1520) are close to the theoretical linear results 1530 in terms of the peak values and the resonant frequencies and further that they are much smoother than those in Case Study No. 1 as shown in FIG. 12.

This finding confirms that the significant variation in frequency responses in Case Study No. 1 is induced by the nonlinear response of the system. It also provides experimental verification that the amplitude of the discharge valve perturbation may significantly affect the accuracy of the FRF estimation in that a smaller amplitude in the valve perturbation yields a better estimate of the linear FRF (with less variation). As with Case Study No. 1, the experimental FRF extracted using IRS 1510 is more consistent than that induced by MLBS 1520 again verifying that use of the IRS based pressure signal provides an improved estimate of the linear dynamics of a pipeline system as compared to that obtained from use of a MLBS based pressure signal.

Case Study No. 3: Input Signal Amplitude $A_{In} \approx 0.06$

Figure 16:
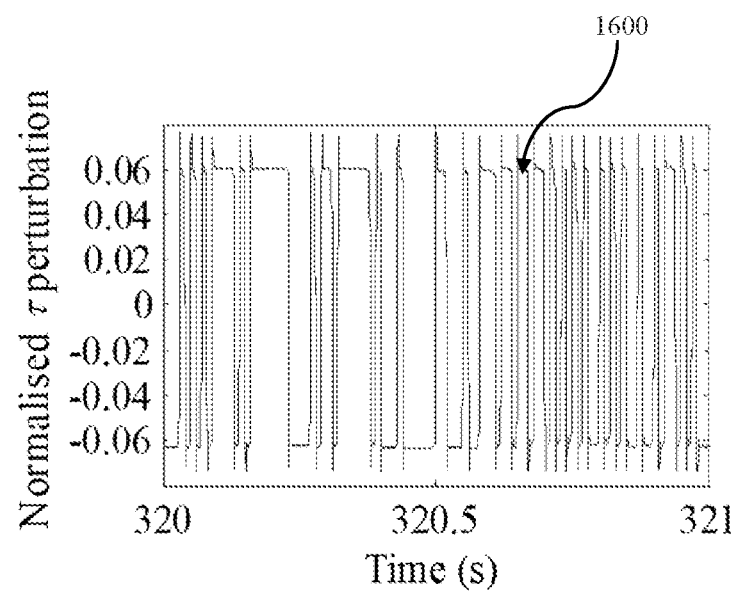
FIG. 16 is a graph of the variation in valve opening state or normalised τ perturbation corresponding to the generation of a pressure signal based on a continuous pseudorandom binary sequence according to an illustrative embodiment for $A_{in} \approx 0.06$.

A third case study was considered with an even smaller amplitude of the valve perturbation ($A_{in} \approx 0.06$). The steady-state discharge when discharge valve 200 was at its most closed position was $7.0 \times 10^{-5}$ m³/s, and the mean discharge out of discharge valve 200 was $7.2 \times 10^{-5}$ m³/s under steady-oscillatory condition. The Darcy-Weisbach friction factor was 0.04. Sections of the normalised IRS r perturbation (input pressure signal) 1600, and its corresponding head perturbation (output pressure signal) 1700, in this case study, are shown in FIGS. 16 and 17 respectively.

Figure 17:
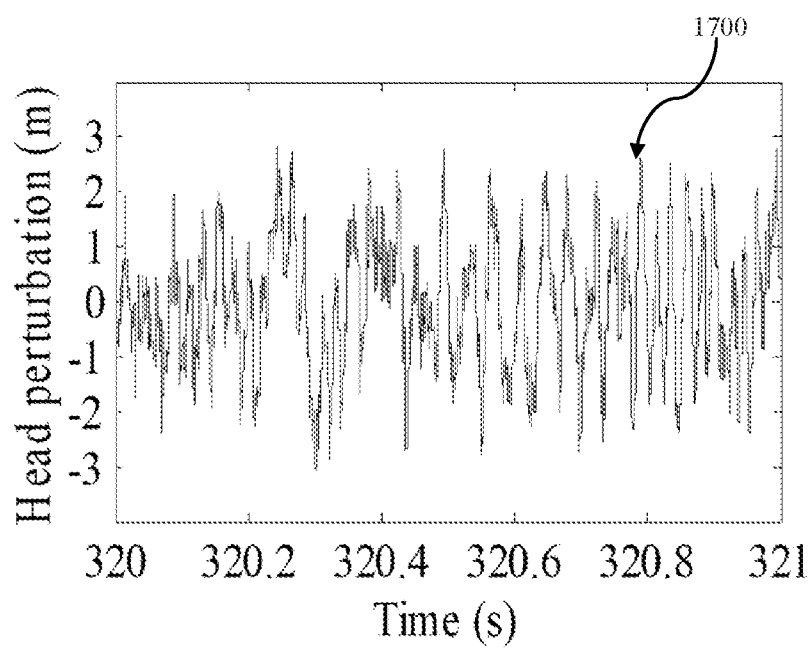
FIG. 17 is a graph of the measured head perturbation or output pressure signal corresponding to the normalised τ perturbation illustrated in FIG. 16 for the pipeline system illustrated in FIG. 8.

In the third case study, the maximum magnitude of the head perturbation as shown in FIG. 17 was further decreased to approximately ±3 m. The experimental FRF determined by using an IRS signal 1810 and a MLBS signal 1820 are compared with the theoretical FRF 1830 in the comparison plot 1800 shown in FIG. 18.

Figure 18:
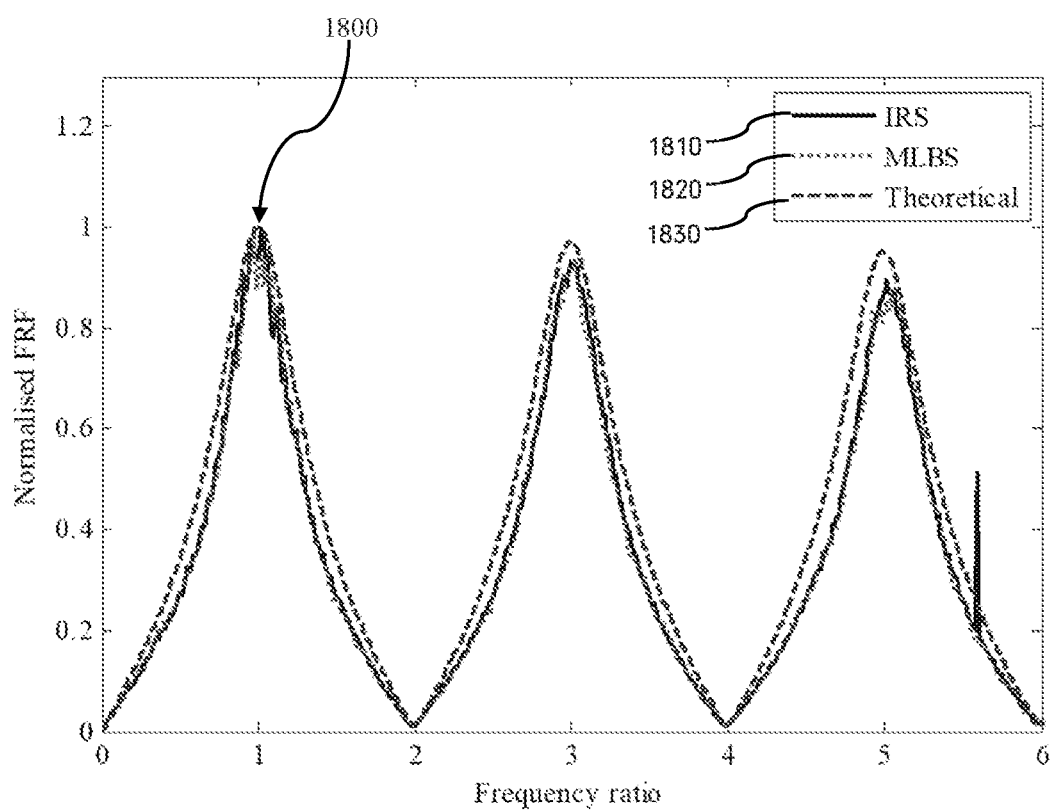
FIG. 18 is a plot of a comparison between the determined FRF resulting from the generated IRS and MLBS excitation signals with the theoretical FRF for the measured head perturbation illustrated in FIG. 17.

As compared to the FRF results obtained in Case Study No. 2 as shown in FIG. 15, both the experimental FRF results 1810, 1820 shown in FIG. 18 show a greater discrepancy from the theoretical FRF 1830. Other than the effects of nonlinearity, which is believed to be mild in this case study since $A_{in}$ is small, the error in the experimental FRF is thought to be related to the low signal-to-noise ratio (SNR) in this setup. The measurement noise is mainly from the background pressure fluctuations in the pipeline system resulting from the turbulence created at discharge valve 200. When discharge valve 200 was fully opened and remained fully open, the background pressure fluctuations observed by pressure transducer 850 were approximately ±1 m in magnitude. In comparison, the measured transient pressure waves observed in Case Study No. 3 (induced by discharge valve 200) as shown in FIG. 17 were just approximately ±3 m. In the experimental FRF resulting from IRS signal 1810, a spike is observed at 50 Hz. This is a false response which is attributed to the low signal power of the IRS at this frequency (therefore low SNR) as discussed in FIG. 10.

The pipeline system characterisation setup depicted in FIG. 8 which was tested in the above case studies is but one type of setup where a pressure signal generation system according to the above embodiments may be advantageously employed. In this particular setup, the experimental results of the three case studies verify that greater relative valve perturbation introduces greater nonlinearity into the pipeline system and further that use of an IRS signal yields better estimation of the linear FRF of a pipeline than the use of a MLBS signal where the nonlinear effect is significant. As a linear system determined FRF is typically indicated in existing FRF based pipeline integrity assessment techniques, such as the detection of leaks, discrete blockages and extended blockages, use of an IRS signal is generally indicated for extracting the linear system FRF of a pipeline system. The anti-symmetric property of an IRS signal enables part of the nonlinear responses of the pipeline system to be cancelled out in the calculation of the cross-correlation function of the input and output pressure signals.

Application to Leak Detection

The determined FRF shown in FIGS. 12, 15 and 18 may be employed to determine the presence and location of a leak using a leak detection technique that employs the relative sizes of the first three resonant peaks to determine the dimensionless leak location. When the FRF is normalised by the first resonant peak (i.e. the first peak is set to unity), the leak detection algorithm can be written as $$x_L^* = \frac{1}{\pi}\arccos\left(\pm\frac{1}{2}\sqrt{1 + \frac{(|h|_5^* - 1)|h|_3^*}{(|h|_3^* - 1)|h|_5^*}}\right).$$

Where $x_L^*$ is the dimensionless leak location and where $|h|_3^*$ and $|h|_5^*$ are the values of the normalised frequency responses at the second and the third resonant peaks (which are the third and the fifth harmonics of the fundamental frequency of the pipeline).

The application of the pressure signal generation system 100 to the detection and location of a leak was examined using the pipeline system shown in FIG. 8. A free discharging orifice with a diameter of 2 mm was located at 31.21 m downstream from tank 820 to simulate a leak. The dimensionless leak location, defined as the ratio of the distance between leak and tank to the total length of the pipeline was calculated as $x_L^* = 0.8316$.

Figure 19:
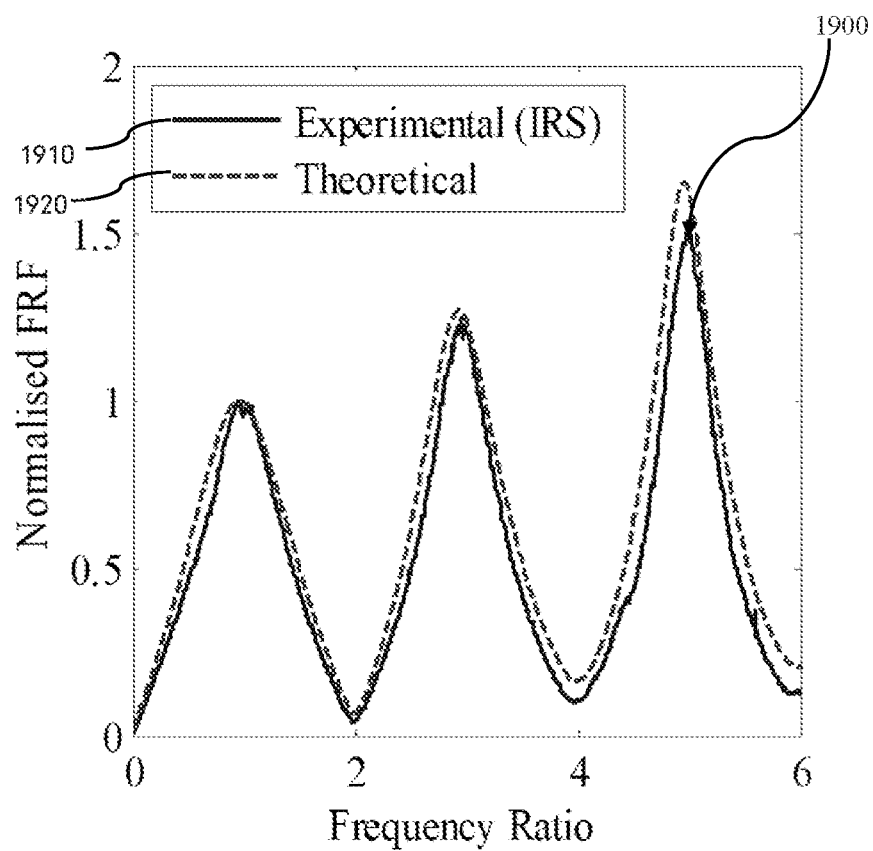
FIG. 19 is a plot of the determined and theoretical FRF for the pipeline system illustrated in FIG. 8 with a leak.

Referring now to FIG. 19, an input pressure signal was generated based on an IRS signal with an amplitude of $A_{in} \approx 0.2$ and the experimental FRF 1910 then determined. It can be seen that the experimental FRF 1910 is close to the theoretical linear FRF 1920 as derived from the transfer matrix method with unsteady friction.

By inspection of FIG. 19, $|h|_3^* = 1.25$ and $|h|_5 = 1.54$. As $|h|_3^* > 1$ this indicates that the leak location $x_L^* \in (0.5, 1)$. As a result, the experimental leak location as determined from the above equation is 0.8115, which has an absolute error of 0.02 when compared with the real location 0.8316. These results indicate that a pressure signal generating system in accordance with the above described embodiments is able to extract the linear system FRF of a pipeline system with enough accuracy for accurate leak detection. As would be readily appreciated, the ability to detect and locate a leak in a pipeline system by generating and measuring a pressure signal at a single location in the pipeline system means that exhaustive inspection of the pipeline system is not required or otherwise may be narrowed to a certain range of locations.

As would be appreciated the FRF is one type of system response function that may be determined. In other embodiments, the impulse response function (IRF) may also be determined from the input and the output signals using system identification theory. Because the output pressure signal is equal to the convolution between the input signal and the IRF, one possible method to calculate the IRF is by adopting a deconvolution process. As the IRF is the time-domain representation of the FRF, the IRF may also be calculated by carrying out an inverse Fourier transform on the determined FRF.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. As would be appreciated, the described functionality maybe in varying ways for each particular application, but such implementation decisions should not be interpreted as causing a departure from the scope of the present disclosure.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgment of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the invention as set forth and defined by the following claims.

The invention claimed is:

1. A system for generating a pressure signal in a pipeline system containing a pressurized fluid, including:
   a discharge valve in fluid communication with the pressurized fluid of the pipeline system to allow fluid from the pipeline system to discharge; and
   an electronic controller configured to dynamically control a degree of opening of the discharge valve to selectively vary the discharge valve between a plurality of valve opening states to generate the pressure signal in the pipeline, wherein the plurality of valve opening states comprises a first partial valve opening state and a second partial valve opening state, and wherein a difference between the first partial valve opening state and the second partial valve opening state is controlled to adjust a normalized amplitude $A_{in}$ of discharge valve movement, the normalized amplitude defined by $A_{in} = \max(\tau - \tau_0)/\tau_0$ where $\tau$ and $\tau_0$ are a perturbation and a mean perturbation respectively determined by the degree of opening of the discharge valve.

2. The system of claim 1, wherein the discharge valve is controlled to vary from the first partial valve opening state to the second partial valve opening state according to a time varying signal.

3. The system of claim 2, wherein the time varying signal is a binary signal.

4. The system of claim 3, wherein the binary signal is a pseudorandom binary sequence (PRBS).

5. The system of claim 4, wherein the pseudorandom binary sequence is a maximum-length binary sequence (MLBS).

6. The system of claim 4, wherein the pseudorandom binary sequence is an inverse-repeat binary sequence (IRS).

7. The system of claim 1, wherein the discharge valve is controlled to generate hydraulic noise between a plurality of selectable noise levels.

8. The system of claim 1, wherein the discharge valve is controlled to vary between the plurality of valve opening states according to a periodic waveform.

9. A discharge valve for a fluid conduit, the discharge valve dynamically controllable in accordance with a control signal to vary between a plurality of valve opening states, the discharge valve including:
   an outer body;
   a piston member reciprocally moveable within the outer body, the piston member having a valving end operable to interrupt the flow of fluid in the fluid conduit; and
   an actuating arrangement to drive the piston member in accordance with the control signal to selectively vary the discharge valve between the plurality of valve opening states to dynamically control a degree of opening of the discharge valve, wherein the plurality of valve opening states comprises a first partial valve opening state and a second partial valve opening state, and wherein a difference between the first partial valve opening state and the second partial valve opening state is controlled to adjust a normalized amplitude $A_{in}$ of discharge valve movement, the normalized amplitude defined by $A_{in} = \max(\tau - \tau_0)/\tau_0$ where $\tau$ and $\tau_0$ are a perturbation and a mean perturbation respectively determined by the degree of opening of the discharge valve.

10. The discharge valve of claim 9, wherein the actuating arrangement includes a first solenoid and associated return biasing means to drive the piston member to the first partial valve opening state and a second solenoid and associated return biasing means to drive the piston member to the second partial valve opening state.

11. The discharge valve of claim 10, wherein a discharge valve transition time between the first partial valve opening state and the second partial valve opening state is of the order of 3 ms.

12. The discharge valve of claim 9, wherein the discharge valve transitions between the first partial valve opening state to the second partial valve opening state according to a pseudorandom binary sequence.

13. A system for determining the system response function of a pipeline system, comprising:
   a discharge valve in fluid communication with the pressurized fluid of the pipeline system to allow fluid from the pipeline system to discharge; and
   an electronic controller configured to dynamically control a degree of opening of the discharge valve to selectively vary the discharge valve between a plurality of valve opening states to generate an input pressure signal in the pipeline, wherein the plurality of valve opening states comprises a first partial valve opening state, and and a second partial valve opening state, and wherein a difference between the first partial valve opening state and the second partial valve opening state is controlled to adjust a normalized amplitude $A_{in}$ of discharge valve movement, the normalized amplitude defined by $A_{in} = \max(\tau - \tau_0)/\tau_0$ where $\tau$ and $\tau_0$ are a perturbation and a mean perturbation respectively determined by the degree of opening of the discharge valve;
   one or more pressure measurement devices configured to measure a time varying pressure response signal resulting from an interaction of the input pressure signal with the pipeline system; and
   a data acquisition and processing system configured to determine the system response function of the pipeline system based on the measured time varying pressure response signal.

14. The system for determining the system response function of a pipeline system according to claim 13, wherein the electronic controller controls the discharge valve to transition between the first partial valve opening state to the second partial valve opening state according to a pseudorandom binary sequence.

15. The system for determining the system response function of a pipeline system according to claim 13, wherein the data acquisition and processing system determines the frequency response function of the pipeline system.

16. The system for determining the system response function of a pipeline system according to claim 13, wherein the data acquisition and processing system determines the impulse response function of the pipeline system.

17. A method for generating an input pressure signal in a pipeline system containing a pressurized fluid, comprising:
   providing a discharge valve in fluid communication with the pressurized fluid of the pipeline system to allow fluid from the pipeline system to discharge; and
   dynamically controlling a degree of opening of the discharge valve to selectively vary the discharge valve between a plurality of valve opening states to generate the input pressure signal in the pipeline, wherein the plurality of valve opening states comprises a first partial valve opening state and a second partial valve opening state, and wherein a difference between the first partial valve opening state and the second partial valve opening state is controlled to adjust a normalized amplitude $A_{in}$ of discharge valve movement, the normalized amplitude defined by $A_{in}=\max(\tau-\tau_0)/\tau_0$ where $\tau$ and $\tau_0$ are a perturbation and a mean perturbation respectively determined by the degree of opening of the discharge valve.

* * * * *